United States Patent
Regensburger et al.

(10) Patent No.: US 11,531,194 B2
(45) Date of Patent: Dec. 20, 2022

(54) MICROSCOPE HAVING AN IMAGING OPTICAL UNIT FOR RECORDING

(71) Applicant: Carl Zeiss Meditec AG, Jena (DE)

(72) Inventors: Alois Regensburger, Poxdorf (DE); Susanne Kohlhammer, Blaustein (DE); Jonathan Essig, Neresheim (DE)

(73) Assignee: Carl Zeiss Meditec AG, Jena (DE)

( * ) Notice: Subject to any disclaimer, the term of this patent is extended or adjusted under 35 U.S.C. 154(b) by 154 days.

(21) Appl. No.: 17/156,263

(22) Filed: Jan. 22, 2021

(65) Prior Publication Data
US 2021/0231938 A1  Jul. 29, 2021

(30) Foreign Application Priority Data
Jan. 23, 2020  (DE) ..................... 10 2020 101 572.0

(51) Int. Cl.
*G02B 21/06* (2006.01)
*G02B 21/00* (2006.01)
*G02B 21/36* (2006.01)

(52) U.S. Cl.
CPC ......... *G02B 21/06* (2013.01); *G02B 21/0072* (2013.01); *G02B 21/367* (2013.01)

(58) Field of Classification Search
CPC .. G02B 21/06; G02B 21/0072; G02B 21/367; G02B 21/00; G02B 21/0004; G02B 21/0012; G02B 21/002; G02B 21/0032; G02B 21/0052; G02B 21/008; G02B 21/10; G02B 21/12; G02B 21/125; G02B 21/18;
(Continued)

(56) References Cited

U.S. PATENT DOCUMENTS 9,456,200 B2   9/2016  Ji et al.
10,269,094 B2 *  4/2019  Fuchs .................. G02B 21/367
(Continued)

FOREIGN PATENT DOCUMENTS

DE   10 2013 006 994 A1   10/2014
DE   10 2014 210 121 A1    8/2015
(Continued)

OTHER PUBLICATIONS

El Gamal, A, "High Dynamic Range Image Sensors", ISSCC'02, Department of Electrical Engineering, Stanford University, 2002, pp. 1 to 62.

*Primary Examiner* — Arnel C Lavarias
(74) *Attorney, Agent, or Firm* — Walter Ottesen, P.A.

(57) ABSTRACT

A microscope includes an illumination unit for illuminating a region of a specimen to generate an illuminated region, an imaging optical unit for magnified imaging of the illuminated region, an image sensor disposed downstream of the imaging optical unit for capturing the magnified image of the illuminated region, a camera for recording an overview region of the specimen without using the imaging optical unit and a control unit for controlling the image sensor and the camera. The overview region includes a part of the illuminated region and a non-illuminated region of the specimen. The control unit actuates the camera to make a recording of the overview region. The control unit actuates the image sensor to cause a recordation of the magnified image of the illuminated region. The control unit generates an overview image based on the recording of the overview region and the recording of the magnified image.

13 Claims, 3 Drawing Sheets

(58) Field of Classification Search
CPC .... G02B 21/36; G02B 21/361; G02B 21/364;
G02B 21/365; G02B 21/368
USPC ....... 359/385, 362, 363, 368, 369, 388, 389,
359/390
See application file for complete search history.

(56) References Cited

U.S. PATENT DOCUMENTS

| | | | |
|---|---|---|---|
| 10,795,143 B2* | 10/2020 | Hauger | G02B 21/0012 |
| 10,989,909 B2* | 4/2021 | Siebenmorgen | G06V 20/698 |
| 11,327,288 B2* | 5/2022 | Haarstrich | G02B 21/367 |
| 2014/0313312 A1* | 10/2014 | Gaiduk | G02B 21/365 |
| | | | 348/79 |
| 2019/0072751 A1 | 3/2019 | Rainbolt et al. | |
| 2019/0137743 A1 | 5/2019 | Schumann | |
| 2020/0088984 A1 | 3/2020 | Haase et al. | |

FOREIGN PATENT DOCUMENTS

| | | |
|---|---|---|
| DE | 10 2016 110 988 A1 | 12/2017 |
| DE | 102017 111 718 A1 | 12/2018 |
| DE | 10 2018 104 704 A1 | 9/2019 |
| DE | 10 2018 110 795 A1 | 11/2019 |
| DE | 10 2018 110 800 A1 | 11/2019 |
| WO | 2013/103870 A1 | 7/2013 |

* cited by examiner

MICROSCOPE HAVING AN IMAGING OPTICAL UNIT FOR RECORDING

CROSS REFERENCE TO RELATED APPLICATION

This application claims priority of German patent application no. 10 2020 101 572.0, filed Jan. 23, 2020, the entire content of which is incorporated herein by reference. The present invention relates to a microscope and, in particular, to a surgical microscope.

BACKGROUND OF THE INVENTION

In the case of surgical microscopes, in particular, there is a need to be able to observe things and events that occur outside of the region imaged in magnified fashion by means of the microscope (referred to as microscope field of the sample below). To this end, use is made of so-called surround cameras, which can record a substantially larger field of view than the small microscope field. Since the microscope field is illuminated very brightly as a rule and since the regions outside of the microscope field are hardly illuminated or not illuminated at all, very difficult recording conditions are present for the surround cameras.

SUMMARY OF THE INVENTION

It is an object of the invention to provide a microscope which supplies a good recording of the microscope field and the surroundings.

Since the overview image is composed from the recording of the overview region and the recording of the magnified image of the illuminated region, the section of the non-illuminated region from the recording of the overview region and the illuminated region from the recording of the magnified image of the illuminated region can advantageously be used to generate the overview image.

The imaging optical unit comprises one or more imaging optical elements. By way of example, these might be lens elements in this case.

The camera preferably comprises a camera optical unit and a camera sensor. By way of example, the camera optical unit can comprise a camera lens. The camera optical unit and/or the camera lens can comprise one or more imaging optical elements. These might be lens elements in this case. The camera sensor can be a digital image sensor. In particular, the camera sensor can be a CMOS sensor or a CCD sensor.

The image sensor of the microscope can be a digital image sensor. By way of example, it can be a CMOS sensor or a CCD sensor.

The recording of the image sensor and the recording of the camera are preferably digital image data, which can be processed further as described, for example in order to generate the desired overview image. Once again, the overview image is preferably in the form of digital image data.

Since the camera records the overview region of the sample without using the imaging optical unit (consequently, the beam path from the sample to the camera does not run through any of the imaging optical elements of the imaging optical unit), it can be directed, for example, obliquely at the overview region of the sample relative to the optical axis of the imaging optical unit of the microscope. In particular, the camera can be embodied as an independent camera. The camera can be mechanically connected to the microscope.

In particular, the camera can record the overview region of the sample in such a way that light coming from the overview region, which is captured by the camera for recording purposes, does not run through any of the imaging optical elements or is not guided by any of the imaging optical elements.

The control device can actuate the camera and the image sensor in such a way that recording of the overview region and recording of the magnified image representation of the illuminated region are carried out at the same time. Using this, the desired overview image can be generated very quickly.

In particular, the recording of the overview region and the recording of the magnified image representation of the illuminated region can be carried out with the same frame rates or with frame rates that differ by no more than 10%.

The control device can carry out a geometric alignment, scaling and/or transformation of the image data of the recording of the illuminated region and/or of the recording of the overview region for the purposes of generating the overview image. This leads to a high-quality overview image.

Further, the control device can generate the overview image in such a way that the resolution of the image data of the recording of the magnified image representation of the illuminated region in the overview image is higher than the resolution of the image data of the recording of the overview region. By way of example, this can provide a digital zoom which can be implemented with higher zoom levels in sections of the illuminated region in comparison with sections of the non-illuminated region in the overview image.

Further, the control device can actuate the camera in such a way that it makes a further recording of the overview region with a value of the recording parameter of the camera that has been adapted to the brightness of the illuminated region and it takes account of the further recording of the overview region when generating the overview image.

Within the scope of this taking into account, the control device can reduce the brightness of the used illuminated region from the further recording.

The sections from the recording of the overview region and the further recording of the overview region which are used to generate the overview image can be selected by the control device on the basis of the brightness in the recordings, on the basis of an image analysis of the illuminated region in the recordings, on the basis of a known geometry of the illuminated region on the basis of the set illumination of the illumination unit and/or on the basis of a reconstructed depth map of the sample.

The recording parameter can be the exposure time, the gain factor of the camera and/or the diaphragm of the camera.

The microscope according to the invention can comprise an illumination unit for illuminating a region of a sample in order to generate an illuminated region, an imaging optical unit for magnified imaging of the illuminated region of the sample, a camera, by means of which an overview region of the sample is recordable without use of the imaging optical unit, and a control device for controlling the camera. The overview region preferably comprises at least a part of the illuminated region of the sample and a non-illuminated region of the sample adjacent to the illuminated region. The control device can actuate the camera in such a way that it makes at least a first recording of the overview region with a value of a recording parameter of the camera adapted to the brightness of the illuminated region and at least a second recording of the overview region with a value of the recording parameter of the camera adapted to the brightness of the non-illuminated region. The control device can generate an overview image on the basis of the at least one first recording and the at least one second recording.

Consequently, a good recording of the illuminated region can be made with the first recording and a good recording of the non-illuminated region can be made with the second recording. As a rule, the non-illuminated region of the first recording and the illuminated region of the second recording will be underexposed and overexposed, respectively, and so these regions have no sensibly usable image information items. However, the image information items in respect of the illuminated region from the first recording and the image information items in respect of the non-illuminated region of the second recording can be used well to generate an overview image, in which both the illuminated region and the non-illuminated region are represented well.

The recording parameter might be the exposure time of the corresponding recording, the gain factor of the camera or of the image sensor of the camera and/or the diaphragm of the camera. However, other or further recording parameters are also possible.

The non-illuminated region of the sample is understood to mean, in particular, a region of the sample that is not illuminated by means of the illumination unit.

In particular, only the brightness of the illuminated region is taken into account for adapting the value of the recording parameter of the camera for the first recording. In the same way, only the brightness of the non-illuminated region can be taken into account for adapting the value of the recording parameter of the camera for the second recording. In particular, only the brightness in a section of the non-illuminated region is taken into account, the section having a predetermined minimum distance from the illuminated region of the sample. This can exclude a transition region, in which the brightness drops from the illuminated region to the brightness of the section of the non-illuminated region.

In the microscope according to the invention, the control device can use (preferably only) image data of the illuminated region from the first recording and (preferably only) image data of the non-illuminated region from the second recording for the overview image. In particular, the control device can reduce the brightness of the used illuminated region from the first recording. Preferably, the brightness of the used illuminated region of the first recording can be reduced to the brightness of the used non-illuminated region of the second recording.

Further, on the basis of the brightness in the recordings, on the basis of an image analysis of the illuminated region in the recordings, on the basis of a known geometry of the illuminated region on the basis of the set illumination of the illumination unit and/or on the basis of a reconstructed depth map of the sample, the control device can select the regions from the first and the second recording which are used to generate the overview image.

Moreover, a third recording of the image representation of the illuminated region of the sample, which has been magnified by means of the imaging optical unit, can be used for the purposes of generating the overview image in the microscope according to the invention. The third recording can be recorded by means of an image sensor disposed downstream of the imaging optical unit.

Thus, for example, the control device can carry out a geometric alignment, scaling and/or geometric transformation of the image data of the third recording on the basis of the first recording of the overview region. Consequently, the third recording can be fitted well into the overview image even though the perspectives or viewing directions for the first and second recording on the one hand and the third recording on the other hand are different since the camera makes the first and second recording without using the imaging optical unit.

The composed overview image and the third recording (magnified image representation of the illuminated region of the sample, and consequently the microscope recording) can be displayed, for example, as an "image-in-image" (for example, on a display device).

Generating the overview image on the basis of the at least one first recording and the at least one second recording is preferably implemented in digital fashion. To this end, the brightness of the section with the illuminated region in the at least one first recording and/or the at least one second recording can be reduced digitally. Preferably, the reduction can be so pronounced that it corresponds to the brightness of the non-illuminated region in the recording. Consequently, in the at least one first recording and/or in the at least one second recording, the illumination of the illumination unit of the illuminated region can be completely or virtually completely airbrushed out of the generated overview image.

Further, the control device could generate the overview image in such a way that the illuminated region in the overview image is composed from image data of the first recording and the third recording. This is particularly advantageous when the third recording does not cover the entire illuminated region (which can also be referred to as microscope field).

The control device can generate the overview image in such a way that the overview image has the same resolution everywhere. However, the overview image could also be generated in such a way that the resolution of the image data of the third recording in the overview image is higher than the resolution of the image data of the second recording.

The control device can actuate the camera in such a way that a plurality of first recordings and a plurality of second recordings are made. Preferably, the recording frequency (or frame rate) of the second recordings (also referred to as second recording frequency below) is greater than the recording frequency (or frame rate) of the first recordings (also referred to as first recording frequency below). This allows the provision of an adapted brightness dynamic range of the first and second recordings. The second recording frequency can be less than 100 Hz, 90 Hz, 80 Hz, 70 Hz or 60 Hz. In particular, the second recording frequency can be 58 Hz. The first recording frequency can be less than 50 Hz, 40 Hz, 30 Hz, 20 Hz, 10 Hz or 5 Hz. In particular, it can be 10 Hz, 9 Hz, 8 Hz, 7 Hz, 6 Hz, 5 Hz, 4 Hz, 3 Hz, 2 Hz or 1 Hz.

The plurality of first recordings and the plurality of second recordings can be used to generate one or more overview images. Naturally, a plurality of third recordings can also be made and taken into account when generating the overview image or images.

The microscope can comprise a display unit for example, a screen, on which the overview image is shown as a still image or the overview images are shown next to one another or successively in time. As it were, it is possible, in particular, to show an overview video or a live video.

The microscope according to the invention can be embodied as a reflected light microscope or as a transmitted light microscope (preferably as a 3D microscope in each case). Further, the microscope according to the invention can be embodied as a surgical microscope (preferably as a 3D surgical microscope). Further, the microscope according to the invention can comprise a recording sensor or image sensor for recording the image representation of the illuminated region of the sample which has been magnified by means of the imaging optical unit. This can be used to make the third recording, for example.

The recording sensor can be a CCD sensor or a CMOS sensor. The camera can comprise a CCD sensor or a CMOS sensor in the same way.

Further, provision can be made of a plurality of cameras, which record a plurality of overview regions as described above (without use of the imaging optical unit) with a first and second recording. The plurality of overview regions can partly overlap or directly adjoin one another. The recordings of the plurality of cameras can be used when generating the overview image.

The camera or the cameras can be referred to as a surround camera and surround cameras, respectively. By way of example, they can be used for gesture control, for marker-based tracking or for measuring the distance between observers and a display device.

The magnified image of the illuminated region can be recorded by means of the image sensor in the microscope according to the invention. Consequently, it is possible to record only a small microscope field. By contrast, the camera or cameras of the overview module can record a substantially larger field of view since they make their recordings without using the imaging optical unit and consequently do not make the recordings through the imaging optical unit.

Further, the sections of the overview image located within the illuminated region can be generated from the third recording (and hence from the microscope recording). To this end, they can be rescaled and geometrically transformed where necessary. This leads to a significant increase in the quality of the sections of the illuminated region in the overview image. The image material with a lower resolution of the at least one first recording and/or the at least one second recording can preferably be used here for an improved geometric alignment. Preferably, the camera (or the surround camera) has a perspective which is very close to the perspective of the image sensor (or the microscope camera). If the object field recorded by means of the third recording is smaller than the illuminated region, the overview image can also be geometrically composed from the at least one first recording, the third recording and the at least one second recording in order to obtain a complete image.

If there are a plurality of surround cameras that point in different directions, the recordings of the plurality of surround cameras can also be composed for the overview image.

By way of example, the resolution of the overview image can be adapted in such a way that it corresponds to the resolution of the camera everywhere. Alternatively, the resolution of the non-illuminated region in the overview image can be digitally increased by calculation. Then, the overview image has the same digital resolution everywhere, with the resolution in part not corresponding to the original quality of the recordings.

Further, there is the option of composing an overview image with locally different resolutions such that the sections of the non-illuminated region in the overview image have a lower resolution than the sections of the illuminated region in the overview image. Hence, it is possible to show all image regions at a low magnification level of the digital image observation of the overview image. If there is a zoom into an image section from the non-illuminated region with the digital image observer, this is stopped after a certain zoom level. However, if there is a zoom into an image section from the illuminated region within the overview image, it is possible to zoom significantly further and ultimately use the full resolution of the third recording.

In the method according to the invention for generating an overview image in the case of a microscope comprising an illumination unit for illuminating a region of a sample in order to generate an illuminated region, an imaging optical unit for magnified imaging of the illuminated region of the sample and a camera, by means of which an overview region of the sample is recordable without using the imaging optical unit, wherein the overview region comprises at least a part of the illuminated region of the sample and a non-illuminated region of the sample adjoining the illuminated region, at least one first recording of the overview region with a value of a recording parameter of the camera which has been adapted to the brightness of the illuminated region and at least one second recording of the overview region with a value of the recording parameter of the camera which has been adapted to the brightness of the non-illuminated region can be made by means of the camera. Then, the overview image can be generated on the basis of the at least one first recording and the at least one second recording.

The method according to the invention can include the method steps described in conjunction with the microscope according to the invention. In the same way, the microscope according to the invention can comprise elements or components for carrying out the steps described in conjunction with the method according to the invention.

Further, a computer program product is provided, which comprises software codes to carry out the steps of the method according to the invention for generating an overview image for a microscope when the product is executed (in particular, on a controller or control unit of a microscope with an illumination unit, imaging optical unit and overview module).

It is understood that the features specified above and the features yet to be explained below can be used not only in the specified combinations, but also in other combinations or on their own, without departing from the scope of the present invention.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
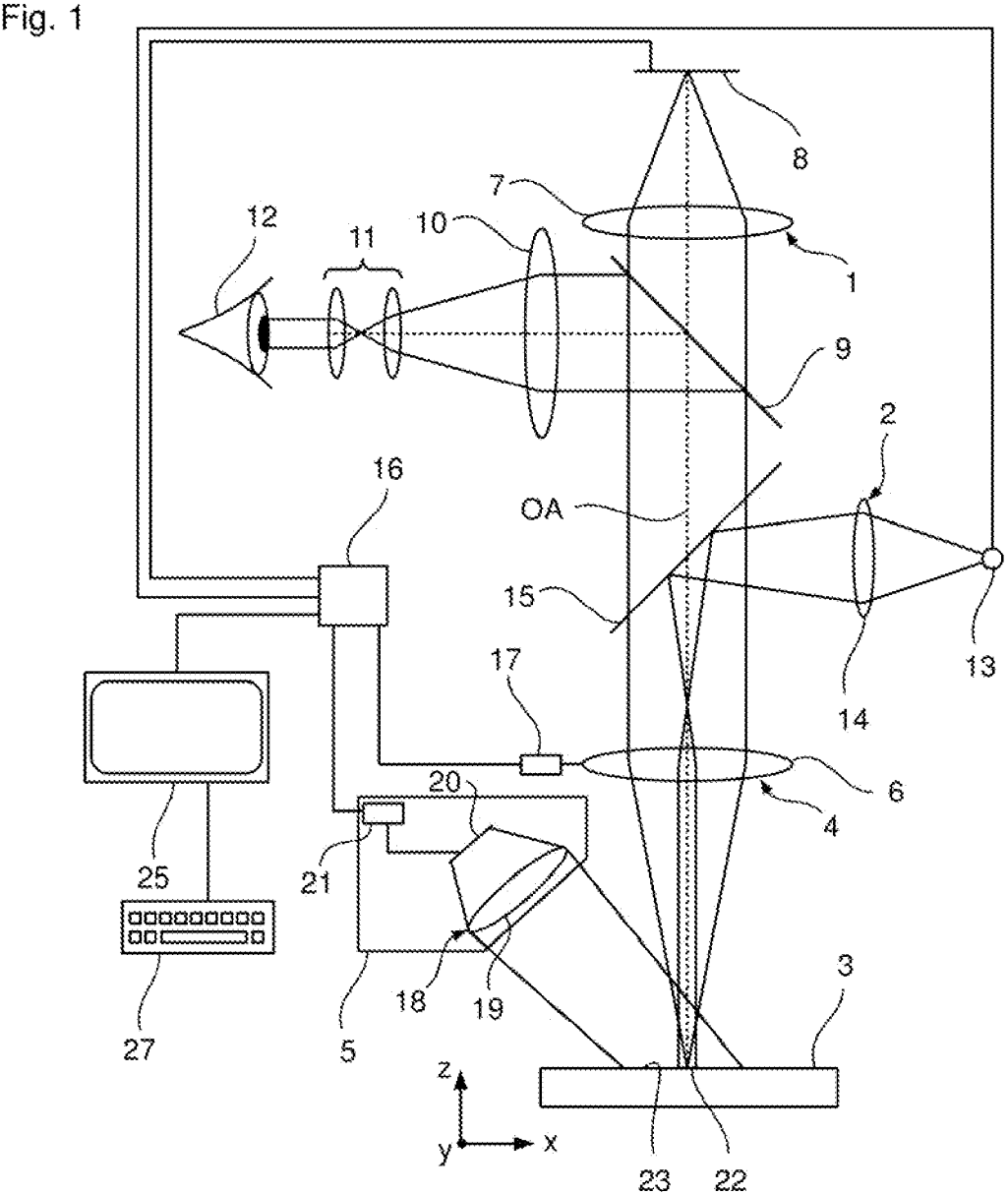
FIG. 1 shows a schematic view of a first embodiment of the microscope according to the invention.

In the embodiment shown in FIG. 1, the microscope 1 according to the invention, which can be embodied as a surgical microscope 1, for example, comprises an illumination unit 2 for illuminating a region of a specimen or sample 3, an imaging optical unit 4 for magnified imaging of the illuminated region of the sample 3 and an overview module 5 for recording an overview region of the sample 3 without using the imaging optical unit 4.

The imaging optical unit 4 schematically illustrated in FIG. 1 comprises a lens 6 and a first tube optical unit 7 for imaging the illuminated region of the sample 3 on a first image sensor 8. Moreover, the imaging optical unit 4 comprises a first beam splitter 9, which is arranged between the lens 6 and the first tube optical unit 7, and a second tube optical unit 10 disposed downstream of the first beam splitter 9 and an eyepiece optical unit 11 such that an optical eyepiece is provided, as indicated by the schematically illustrated eye 12 of a user.

The illumination unit 2 comprises a light source 13, a collector optical unit 14 disposed downstream of the light source 13, a second beam splitter 15 that is arranged between the lens 6 and the first tube optical unit 7, and the lens 6. The light of the light source 13 is focused by the collector optical unit 14 and coupled into the beam path between the second beam splitter 15 and the lens 6 by the second beam splitter 15 in such a way that the region of the sample 3 to be illuminated is illuminated with beams that are parallel where possible, as illustrated schematically in FIG. 1. By way of example, the light source can be embodied as a halogen lamp, as a xenon discharge lamp, as an LED or as a laser.

Further, the microscope 1 comprises a controller 16, which is connected, for example, to the light source 13, the first image sensor 8 and a z-drive 17, by means of which the lens can be moved in the z-direction for adjusting the focus.

Figure 2:
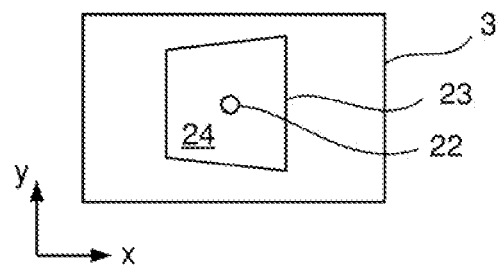
FIG. 2 shows a plan view of the sample 3 of FIG. 1.

The overview module 5 comprises a camera 18 with a camera optical unit 19 and a camera sensor 20. Moreover, the overview module 5 comprises a control unit 21 for controlling the camera 18. The control unit 21 and the controller 16 can also be referred to, in each case on their own or together, as a control device. As can be gathered from the schematic illustration of FIG. 1, the camera 18 records an overview region 23 of the sample 3 via the camera optical unit 19 and the camera sensor 20, the overview region being larger than the illuminated region 22 and completely containing the illuminated region 22. In the plan view of the sample 3 in FIG. 2, the illuminated region 22 of the sample has a circular representation. The overview region 23 is slightly trapezoidal, with the illuminated region 22 being located completely within the overview region 23.

If a recording of the overview region 23 should be made with the overview module 5, it is consequently the case that the illuminated region 22 has a very high brightness because of the illumination whereas the non-illuminated region 24 of the overview region 23 (that is, the overview region 23 without the illuminated region 22) has a very low brightness. Typically, even the ambient light is greatly reduced when the microscope 1 is used. Therefore, there is a great brightness difference between the illuminated region 22 and the non-illuminated region 24, wherein this brightness difference may be so large that it is practically impossible to make a single recording of the overview image 23 using the camera 18.

Therefore, the control unit 21 actuates the camera 18 in such a way that a first recording of the overview region 23 is made, in which the value of a recording parameter of the camera 18 is adapted to the brightness of the illuminated region 22. By way of example, the recording parameter can be the exposure time, the gain factor of the camera sensor 20, the diaphragm, et cetera. Naturally, a plurality of parameters can also be chosen accordingly. What is essential is that the camera 18 is actuated in such a way in the process that the illuminated region 22 is represented well in the first recording of the overview region 23. Preferably, there is no overexposure or underexposure of the illuminated region 22 in the first recording. As a rule, the non-illuminated region 24 is recorded in such underexposed fashion in the first recording of the overview region 23 that no meaningful image information is contained therein.

Then, the control unit 21 actuates the camera 18 to record a second recording of the overview region 23, wherein the value of the recording parameter is adapted to the brightness of the non-illuminated region 24 in the second recording. Hence, the non-illuminated region 24 is easily identifiable in the second recording or overview recording and the illuminated region 22 is so greatly overexposed that no meaningful image information items are contained therein for the illuminated region 22.

Then, the overview module 5 can generate an overview image from the first recording and the second recording, in which overview image, for example, the image information items for the illuminated region 22 from the first recording and the image information items for the non-illuminated region 24 from the second recording are used. As a result, it is possible to compose an overview image in which both the illuminated region 22 and the non-illuminated region 24 are identifiable. By way of example, the overview image can be displayed by way of a screen 25 (FIG. 1).

The first and second recordings can be generated in an ongoing fashion. In so doing, the recording frequency (or frame rate) for the first and second recording can be the same or different. Preferably, the recording frequency for the second recordings can be greater than for the first recordings. Thus, for example, the first recordings can be recorded with a frequency of 2 Hz and the second recordings can be recorded with a frequency of 58 Hz.

As already described, an overview image is generated from the first recording and the second recording. Naturally, this can also be carried out in an ongoing fashion such that overview images are generated and displayed in an ongoing fashion. Using this, it is virtually possible to display an overview video on the screen 25.

The described composition of the overview image from parts of the first and second recording is preferably carried out digitally. In the process, the brightness of the first recording, and hence the brightness of the recorded illuminated region 22, can be reduced digitally. Preferably, it is digitally reduced in such a way that it corresponds to the brightness of the non-illuminated region 24 in the second recording. Hence, the microscope illumination can be completely or virtually completely airbrushed from the overview image.

The regions of the first and second recording which are used to compose the overview image can be ascertained, for example, by way of the brightness in the recordings, by way of an image analysis of the illuminated region in the recordings, by way of a known geometry of the illumination generated by means of the illumination unit 2 on the basis of the zoom and/or focusing, for example set by means of the lens 6, by way of a reconstructed depth map of the recorded sample 3 or by way of any combinations of the aforementioned options.

The overview image generated thus and the microscopy image of the illuminated region 22 recorded by the first image sensor 8 can be displayed simultaneously on the screen 25. They can be displayed next to one another. Alternatively, they can be displayed in partly or completely overlaid fashion. In particular, the recording of the first image sensor 8 can be displayed as an image within the overview image.

Figure 3:
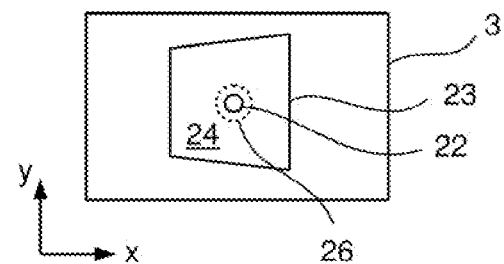
FIG. 3 shows a further plan view of the sample 3 of FIG. 1.

In the case of the second recording, it is possible to use only the brightness from the non-illuminated region 24 as per FIG. 3 for the purposes of setting the camera parameter values. The non-illuminated region 24 differs from the non-illuminated region 24 as per FIG. 2 in that it additionally does not have a transition region (indicated by the dotted line 26 in FIG. 3) next to the illuminated region 22, in which transition region the brightness drops from the illuminated region 22 to the no longer illuminated surrounding region 24.

Further, the recording via the first image sensor 8, and hence microscope recording with a very high resolution, can be used when generating the overview image. In this case, the first recording and, in particular, the illuminated region 22 recorded therein can be used for the composition to carry out a scaling of the recording via the first image sensor 8 and a possibly necessary geometric transformation of the corresponding image data, which is caused by the different recording angles relative to the sample 3 between the recording by way of the lens 6 and the first tube optical unit 7 on the one hand and the recording by means of the overview module 5 on the other hand. The quality of the image region for the illuminated region in the overview image increases significantly as a result thereof. If the object field in the illuminated region 22 recorded by means of the first image sensor 8 is smaller than the illuminated region 22, image data from the first and second recording and from the recording by means of the first image sensor 8 can be contained in the overview image. Here, the image data from the recorded illuminated region 22 which are not contained in the recording by means of the first image sensor 8 are preferably taken from the first recording.

Further, the overview image from the microscope recording and only the second recording can be generated digitally. In this case, the control unit can actuate the camera 18 in such a way that only the second recording is made (the first recording is not necessary in that case).

However, it is also possible to take account of both the first and second recording and also the microscope recording when generating the overview image. In this case, the control unit 21 actuates the camera in such a way that the first and second recording are made.

The resolution of the overview image can be adapted in such a way that it corresponds to the resolution of the camera 18 in the entire overview image. Alternatively, the resolution of the overview image in the non-illuminated region 24 can be increased digitally to the resolution of the recording by means of the first image sensor 8 by calculation. Then, the overview image has the same digital resolution everywhere, with the resolution in part not corresponding to the original quality of the image material.

Further, the overview image can also be composed in such a way that locally different resolutions are present. Here, the resolution of the overview image is lower in the non-illuminated region 24 than in the illuminated region 22 (since the recording of the first image sensor 8 is used here). In the case of an observation by way of the screen 25, this can be taken into account in such a way that all image regions can be seen in the case of a low magnification level of the image representation on the screen 25, which magnification level can be set by way of an input interface 27 (for example, a keyboard), for example. If there is a zoom into the overview image, this is stopped after a certain zoom level in a section of the non-illuminated region 24. However, it is possible to zoom significantly further into the illuminated region 22 and it is consequently possible to use the full resolution of the recording of the first image sensor 8.

Figure 4:
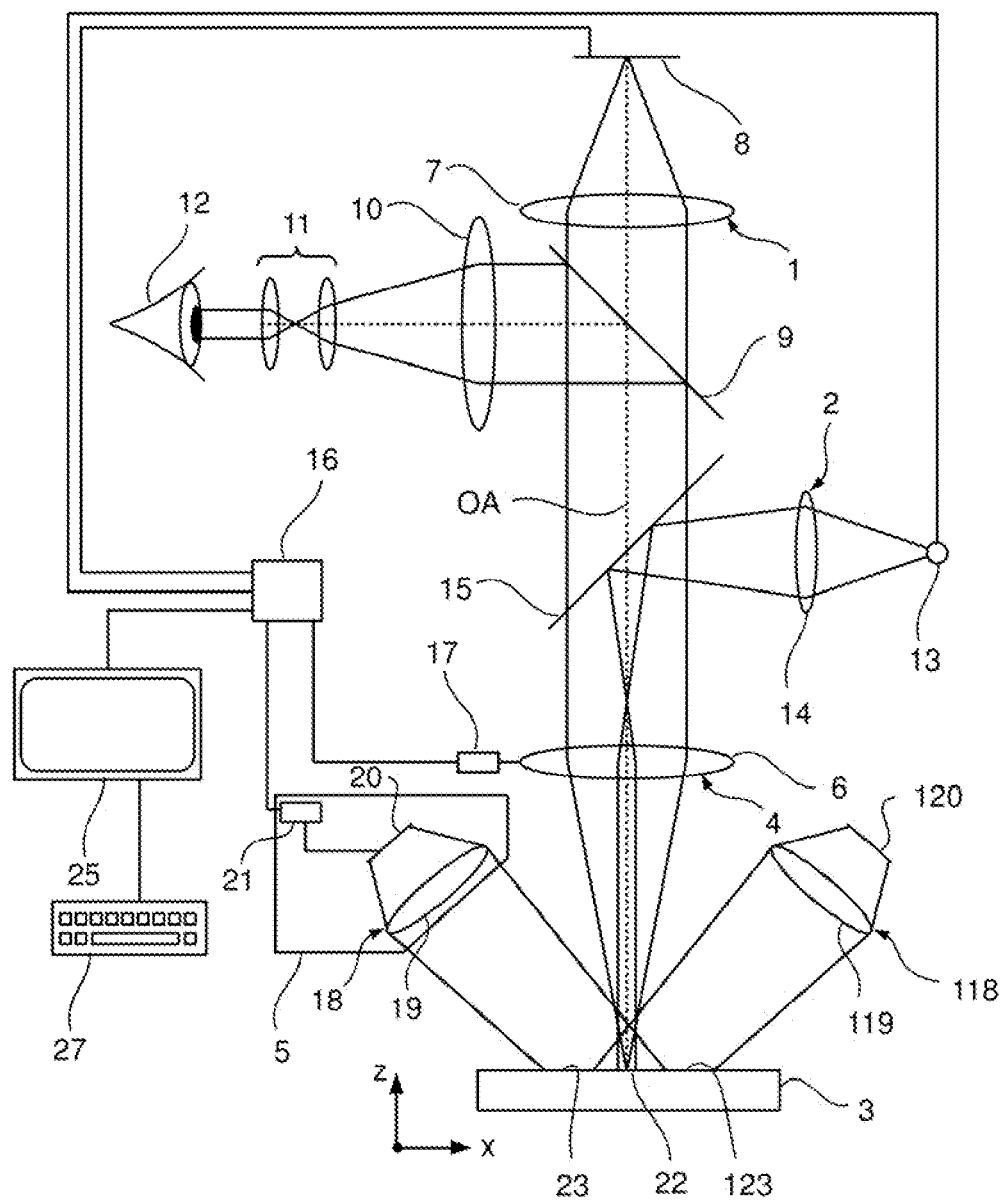
FIG. 4 shows a schematic illustration of a second embodiment of the microscope according to the invention; and, FIG. 5 shows a plan view of the sample 3 of FIG. 4.
Figure 5:
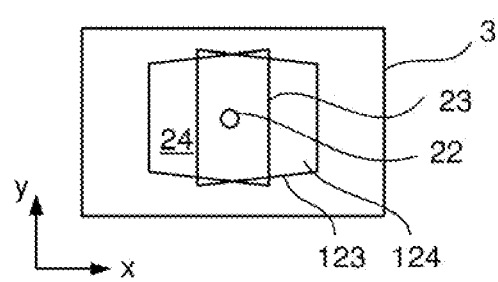

It is not the case that the overview module 5 can only comprise one camera 18, as described above. It is possible for the overview module 5 to comprise a plurality of cameras 18, 118, with the overview regions 23, 123 of the cameras 18, 118 preferably overlapping in part. FIG. 4 schematically shows a microscope 1 according to the invention, in which the overview region 23 of the first camera 18 partly overlaps with the overview region 123 of the second camera 118, as schematically illustrated in FIG. 5 in the same way as in FIG. 2. The second camera 118 can have the same embodiment as, or a different embodiment to, the first camera 18, with corresponding elements of the second camera 118 being denoted by reference signs that have been increased by one hundred, that is, the camera optical unit 119 and camera sensor 120 of the second camera 118. The second camera 118 can be controlled by means of the control unit 21, with no connecting line being plotted in order to simplify the illustration of FIG. 4.

It is understood that the foregoing description is that of the preferred embodiments of the invention and that various changes and modifications may be made thereto without departing from the spirit and scope of the invention as defined in the appended claims.

What is claimed is:

1. A microscope, comprising
an illumination unit for illuminating a region of a specimen to generate an illuminated region of the specimen;
an imaging optical unit defining an optical path and including one or more imaging optical elements to effect a magnified imaging of said illuminated region;
an image sensor disposed along said optical path downstream of said imaging optical unit and being configured to capture a magnified image of said illuminated region of said specimen;
a camera configured to record an overview region of the specimen without using said imaging optical unit in such a manner that light coming from said overview region and which is captured by said camera for recordation is not guided by said one or more imaging optical elements;
a control unit for controlling said image sensor and said camera;
said overview region including at least a part of said illuminated region and a non-illuminated region of said specimen bordering on said illuminated region;
said control unit being configured to drive said camera so as to cause said camera to make a recording of said overview region with a value of a recording parameter of said camera adapted to a brightness of said non-illuminated region;
said control unit being further configured to drive said image sensor so as to cause said image sensor to effect a recordation of a magnified image of said illuminated region of said specimen; and,
said control unit being configured to generate an overview image based on said recording of said overview region and the recording of the magnified image of said illuminated region.

2. The microscope of claim 1, wherein, for the overview image, the control unit uses the illuminated region from the recording of the illuminated region and the non-illuminated region from the recording of the overview region.

3. The microscope of claim 1, wherein the control unit actuates the camera and the image sensor in such a way that recording of the overview region and recording of the magnified image of the illuminated region are carried out at a same time.

4. The microscope of claim 1, wherein the control unit actuates the camera and the image sensor in such a way that recording of the overview region and recording of the magnified image of the illuminated region are carried out at matching frame rates or at frame rates that differ by no more than 10%.

5. The microscope of claim 1, wherein the control unit carries out at least one of a geometric alignment, scaling, and transformation of the image data of the recording of at least one of the illuminated region and of the recording of the overview region for generating the overview image.

6. The microscope of claim 1, wherein the control unit generates the overview image in such a way that the resolution of the image data of the recording of the magnified image of the illuminated region in the overview image is higher than a resolution of the image data of the recording of the overview region.

7. The microscope of claim 1, wherein the control unit actuates the camera in such a way that it makes a further recording of the overview region with a value of the recording parameter of the camera adapted to a brightness of the illuminated region and it takes account of the further recording of the overview region when generating the overview image.

8. The microscope of claim 7, wherein the control unit reduces the brightness of the used illuminated region from the further recording when generating the overview image.

9. The microscope of claim 8, wherein sections from the recording of the overview region and the further recording of the overview region which are used to generate the overview image are selected by the control unit on a basis of at least one of a brightness in the recordings, an image analysis of the illuminated region in the recordings, a known geometry of the illuminated region on a basis of the set illumination of the illumination unit and a basis of a reconstructed depth map of the specimen.

10. The microscope of claim 7, wherein sections from the recording of the overview region and the further recording of the overview region which are used to generate the overview image are selected by the control unit on a basis of at least one of a brightness in the recordings, an image analysis of the illuminated region in the recordings, a known geometry of the illuminated region on a basis of the set illumination of the illumination unit, and a reconstructed depth map of the specimen.

11. The microscope of claim 1, wherein the recording parameter is at least one of an exposure time, a gain factor of the camera, and a diaphragm of the camera.

12. A method for generating an overview image in a context of a microscope including an illumination unit for illuminating a region of a specimen to generate an illuminated region; an imaging optical unit for magnified imaging of the illuminated region of the specimen; an image sensor disposed downstream of the imaging optical unit and which serves for capturing a magnified image of the illuminated region of the specimen; a camera configured to record an overview region of the specimen without using the imaging optical unit; the overview region including at least a part of the illuminated region of the specimen and a non-illuminated region of the specimen bordering the illuminated region; the method comprising the steps of:

actuating the camera in such a way that it makes a recording of the overview region with a value of a recording parameter of the camera that has been adapted to a brightness of the non-illuminated region;

actuating the image sensor in such a way that it carries out a recordation of the magnified image of the illuminated region of the specimen; and, generating an overview image on a basis of the recording of the overview region and the recording of the magnified image of the illuminated region of the specimen.

13. A computer program product for generating an overview image in a context of a microscope including an illumination unit for illuminating a region of a specimen to generate an illuminated region, an imaging optical unit for magnified imaging of the illuminated region of the specimen, an image sensor disposed downstream of the imaging optical unit and which serves for receiving a magnified image of the illuminated region of the specimen, a camera configured to record an overview region of the specimen without using the imaging optical unit, the overview region including at least a part of the illuminated region of the specimen and a non-illuminated region of the specimen bordering the illuminated region, the computer program product being stored; the computer program product comprising:

software code stored on a non-transitory computer readable medium, said software code being configured, when executed by a processor, to:

actuate the camera in such a way that it makes a recording of the overview region with a value of a recording parameter of the camera that has been adapted to a brightness of the non-illuminated region;

actuate the image sensor in such a way that it carries out a recordation of the magnified image of the illuminated region of the specimen; and, generate an overview image on a basis of the recording of the overview region and the recording of the magnified image of the illuminated region of the specimen.

\* \* \* \* \*

UNITED STATES PATENT AND TRADEMARK OFFICE
CERTIFICATE OF CORRECTION

| | |
|---|---|
| PATENT NO. | : 11,531,194 B2 |
| APPLICATION NO. | : 17/156263 |
| DATED | : December 20, 2022 |
| INVENTOR(S) | : A. Regensburger et al. |

It is certified that error appears in the above-identified patent and that said Letters Patent is hereby corrected as shown below:

On the Title Page

Under (72) Inventors, Jonathan Essig: delete "Neresheim (DE)" and insert -- Aalen (DE) -- therefor.

Signed and Sealed this
Twenty-third Day of May, 2023

Katherine Kelly Vidal
*Director of the United States Patent and Trademark Office*